Sept. 1, 1942. B. P. HAZELTINE 2,294,658
PIPE HANDLING APPARATUS
Filed June 27, 1940 2 Sheets-Sheet 2

WITNESSES
INVENTOR.
Benjamin P. Hazeltine
BY Brown, Critchlow & Flick
his ATTORNEYS.

Patented Sept. 1, 1942

2,294,658

UNITED STATES PATENT OFFICE 2,294,658

PIPE HANDLING APPARATUS

Benjamin P. Hazeltine, Wheeling, W. Va.; Emily H. Hazeltine administratrix of said Benjamin P. Hazeltine, deceased Application June 27, 1940, Serial No. 342,740

6 Claims. (Cl. 29—70)

This invention relates to apparatus for handling pipes, rods, and the like, and more particularly to such apparatus including a cooling table for pipes. The word "pipe" shall be used herein for convenience; however, it is to be understood that the invention is not limited to use with tubes but may also be used with rods and other elongate objects.

It is general practice after a hot pipe is formed to place it on a cooling table or rack over which it is slowly carried until it is relatively cool. In some cases the hot pipe is straightened before it reaches the cooling table. These cooling tables usually are long chain conveyors provided with upright stops that engage the pipe in order to hold it in position while it is being carried by the chains. When it is attempted to saw an end of the pipe on the moving chains the pressure of the saw against the pipe tends to swing it on the chains so that the cut is not at right angles to the axis of the pipe. Furthermore, the chains wear, stretch and often get out of alignment.

It is among the objects of this invention to provide pipe handling apparatus which occupies a relatively small space, which has a long life and a very low upkeep cost, which does not get out of alignment, which does not permit two pipes to be moved along in contact with each other, which saws the ends of the pipes satisfactorily, and which automatically cuts the pipes to any desired length.

Figure 1:
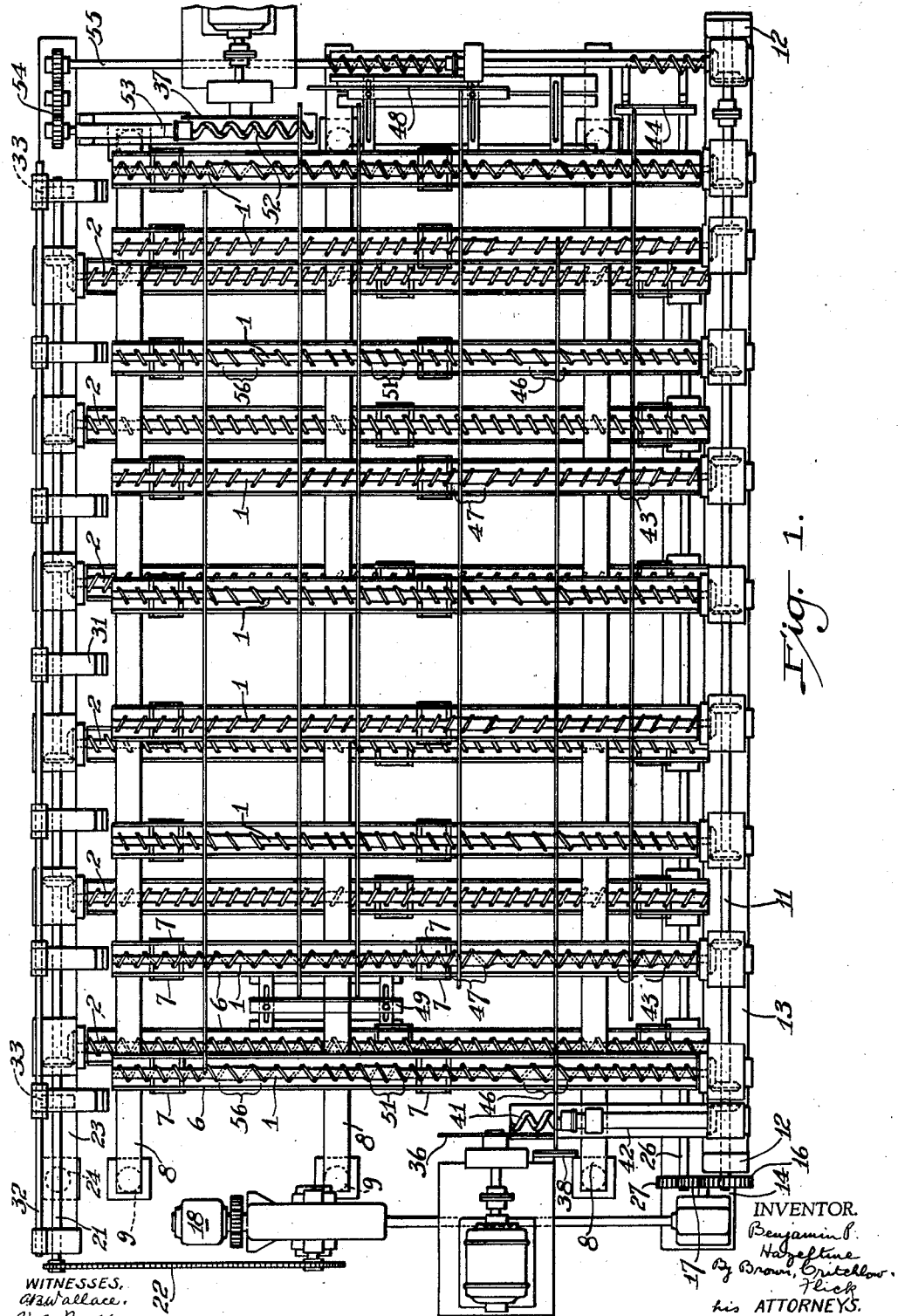
Figure 2:
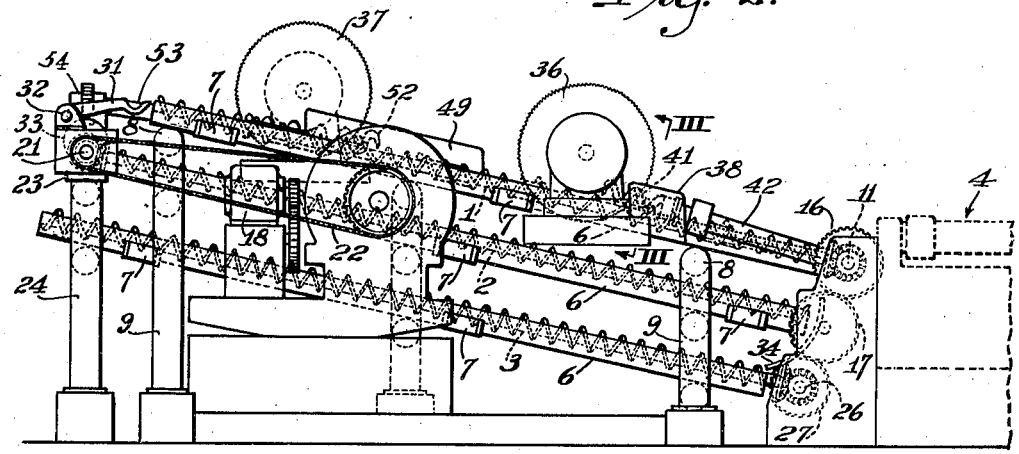
Figure 3:
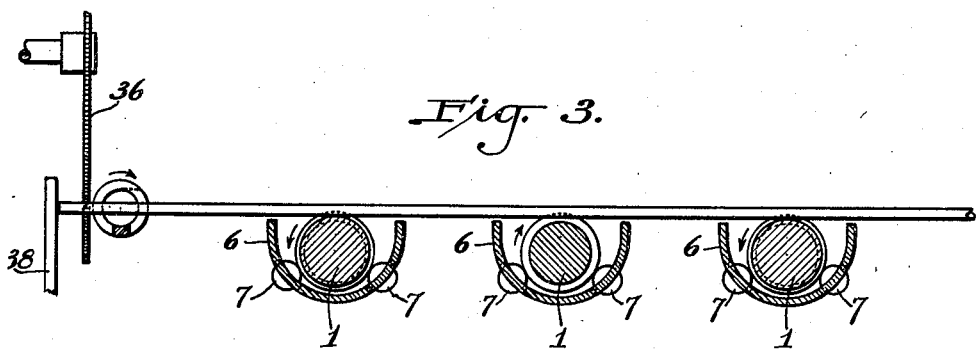

The invention is illustrated in the accompanying drawings in which Fig. 1 is a plan view of my apparatus; Fig. 2 is an end view thereof; and Fig. 3 is an enlarged vertical section taken on the line III—III of Fig. 2.

Referring to the drawings, a cooling table is formed from a plurality of substantially parallel conveyor screws 1, 2 and 3 adapted to receive pipes between their threads. Preferably, the table is mounted adjacent the delivery side of a straightening machine 4, such as shown in my Patent No. 2,199,130, from which is received hot straightened pipes. To conserve space the table is relatively short, but is formed with a plurality of different levels across each of which the pipe is carried before it leaves the table, as shown in Fig. 2 and as will be described in more detail presently. The screws may be rotatably mounted in various ways, although a convenient way is to support them in trough-like members 6 that are provided at longitudinally spaced points with pairs of openings in which are journaled rollers 7 on which the screws rest. The upper level or row of troughs is supported by horizontal beams 8 mounted on the upper ends of vertical columns 9 at the sides of the machine. All of the upper screws 1 are driven from the straightening machine end from a shaft 11 extending across the table and supported in bearings 12 mounted on a horizontal beam 13 carried by pedestals 14. Rigidly mounted on one end of the shaft is a gear 16 which is driven by a gear 17 from a motor 18. The intermediate row of screws 2 is supported in substantially the same manner as the upper row, but these screws are driven from the opposite end of the table by a shaft 21 connected to motor 18 by a chain and sprocket drive 22. This shaft is mounted on a beam 23 supported at its ends by columns 24. The screws 3 in the bottom row are also mounted like the ones above and are driven from the same end as the upper screws by a shaft 26 on which is a gear 27 that meshes with gear 17 connected to the motor.

It will be clear that pipes are pushed across the cooling table by the portions of the screw threads that engage their rear sides. The pitch of the threads is great enough so that only the rear sides of the pipes are engaged by the threads, unlike the straightening machine on which opposite sides of the pipes are gripped by the screw threads. To prevent lengthwise movement of the pipes, except when it is wanted, the sides of trough-like members 6 extend high enough between the screws to serve as skids for supporting the pipes above the rotating hubs of the screws. On the other hand in order to move the pipes axially in both directions in a manner and for a purpose to be described presently, about half of the screws in each row are rotated in a direction opposite to the other half. The screws of these two groups preferably alternate across the table. The threads on these screws likewise wind around the hubs in opposite directions so that all of them will feed forward. Even with the screws turning in opposite directions it is desirable to have the skids for supporting the pipes above the screw hubs, because it would be practically impossible to have every pipe bear against all hubs with the same force and there would therefore be a tendency for the pipes to be moved axially by the screws.

When the pipes reach the far end of the upper screws they roll off into notches in arms 31 which are rigidly mounted at their outer ends on a shaft 32 extending across the end of the table. Rigidly mounted on shaft 21 that drives the intermedate row of screws is one or more cams 33 which engage the bottoms of the arms and thereby cause them to oscillate up and down. When the arms with a pipe in their notches are lowered, the pipe is deposited on the intermediate screws and carried by them back across the table toward its entry end. At this end of the screws the pipe is cool and rigid enough to be permitted to roll off and drop onto curved tracks 34 on which it rolls down onto the lower level of screws. These screws carry the pipe back across the table again, and from them the pipe drops off onto cradles or the like (not shown) from which a lift of pipes may be carried away from the machine. By the time the pipe has traversed the three levels of the table it is relatively cool.

In accordance with this invention the table is inclined upwardly away from the straightening machine, as shown in Fig. 2. By choosing the proper angle relative to the height of the thread, the size of the pipe and other related factors, it will be found that only one pipe can remain in the pocket between any two adjacent turns of the thread of a screw. Thus, if two or more pipes happen to be fed to the table so closely together that they fall into one pocket, all but one of these pipes will roll back over the thread and into the next pocket before the screw makes more than a revolution or two. Another advantage of having the inclined table is that when it has several levels, as shown in the drawings, it permits the cooled pipe to be delivered at a higher level than if the table were horizontal. Therefore, a deep pit does not have to be provided.

Another feature of this invention is that the pipes have their ends cut off as they are carried across the table. For this purpose a saw is mounted at each end of the table, one, 36, being near the entry end for cropping the pipes, and the other, 37, near the delivery end for cutting them to length. In order to correctly position the pipes for cropping they must be moved lengthwise against a stop 38 just before they are moved into saw 36. To permit this endwise movement the hubs of the screws in the upper row having right-hand threads are enlarged at predetermined points sufficiently to lift the pipes off the skids, as shown in Fig. 3. As soon as this occurs these screws, all of which are turning toward the left, quickly move the pipe lengthwise in that direction until arrested by stop 38. The pipe is presently moved back across the table to the other saw in the same manner by enlarging the hubs of the other groups of screws as will be described hereinafter.

To prevent the pipe from swinging around on the table when it engages saw 36, the end portion being sawed is gripped by a helical member 41 carried on one end of a shaft 42 that is driven from the upper shaft at the same speed as the adjacent screws. This helical member engages both the front and rear sides of the pipe simultaneously and thereby provides a two-point support for it which prevents the pipe from swinging when it engages the saw. To permit the pipes to clear shaft 42 they first are moved lengthwise toward the opposite end of the table by enlarged portions 43 of the hubs of those screws that turn toward the right. A stop 44 prevents them from moving too far. The pipes then move laterally only until they have cleared shaft 42 and then they are moved toward the saw by enlarged hub portions 46 of those screws that turn toward the left, as shown in Fig. 3. The pipes move axially until they strike stop 38 whereupon their movement becomes lateral only and they are carried through the saw by which their ends are cropped.

As each pipe traverses helical member 41 practically along its axis, the pitch of this member must be greater than is required for the threads of the screw conveyors. However, it necessitates an increase in the pitch of the portions of the screw threads opposite the helical member, as shown in Fig. 1. A natural result is that the pipes are moved through the saws more rapidly than across the other portions of the table.

As soon as the end of a pipe has been cropped the pipe reaches enlarged hub portions 47 of the screws turning toward the right and is lifted thereby from the skids and carried toward the right where its movement is limited by a stop 48. This movement is to enable the cropped end of the pipe to clear an adjustable gauge bar 49 by which the length of the finished pipe is determined. The pipe is moved back to the left, until it strikes this bar, by enlarged hub portions 51 of the screws turning in that direction. Thereupon, the pipe is lowered onto the skids again and moved laterally through saw 37 where it is steadied by another helical member 52 driven by a shaft 53 and gearing 54 from a shaft 55 operably connected to drive shaft 11. The distance from gauge bar 49 to saw 37 is the length to which the pipe is cut. After being cut by this saw the pipe moves up onto enlarged hub portions 56 of the screws rotating to the left so that the pipe will clear the drive shaft 53 of helical member 52. From then on the pipe moves laterally only until it rolls off the ends of the upper row of screws and into the notches of transfer arms 31.

Only enough pipes have been shown on the table in Fig. 1 to illustrate the positions they occupy at different points in their travel across the table.

It will thus be seen that with apparatus constructed in accordance with this invention pipes can be cooled in a relatively small space and simultaneously cut to any desired length. The screws do not get out of alignment as chain conveyors do, and their inclination prevents more than one pipe from being carried in any one pocket of a screw. This last feature is especially important when the pipes are being sawed, because, obviously, two pipes in the same pocket would interfere with the sawing.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. Pipe handling apparatus comprising a table of substantially parallel conveyor screws adapted to receive pipes between their threads with the threads engaging only the rear sides of the pipes, means for rotating the screws to cause their threads to move the pipes longitudinally of the screws, means disposed beside the screws for normally supporting the pipes above the screw hubs to prevent movement of the pipes lengthwise, and means for performing an operation on the pipes, the tops of said supporting means at a predetermined point relative to said operation performing means lying in a plane below the tops of the adjacent portions of at least some of the screw hubs, whereby said adjacent portions of the hubs support the pipes above said supporting means and move them lengthwise.

2. Pipe handling apparatus comprising a group of substantially parallel right-hand conveyor screws, a group of substantially parallel left-hand conveyor screws at least some of which are disposed between some of the right-hand screws, said screws being arranged to receive pipes between their threads with the threads engaging only the rear sides of the pipes, means for rotating the screws to cause their threads to move the pipes longitudinally of the screws, means extending longitudinally of the screws for normally supporting the pipes above the screw hubs to prevent movement of the pipes lengthwise, and means for performing an operation on the pipes, the hubs of the screws in one of said groups being enlarged at a predetermined point relative to said last-mentioned means and to the adjacent portions of the screw hubs in the other group whereby to lift the pipes off said supporting means and move them lengthwise in one direction, the screw hubs in the other group being enlarged at a predetermined point relative to adjacent normal diameter portions of screw hubs in the first group whereby to move the pipes lengthwise in the opposite direction.

3. Pipe handling apparatus comprising a group of substantially parallel right-hand conveyor screws, a group of substantially parallel left-hand conveyor screws at least some of which are disposed between some of the right-hand screws, said screws being arranged to receive pipes between their threads with the threads engaging only the rear sides of the pipes, means for rotating the screws to cause their threads to move the pipes longitudinally of the screws, means disposed beside the screws for normally supporting the pipes above the screw hubs to prevent movement of the pipes lengthwise, a saw mounted at one side of the groups of screws for cropping the adjacent ends of the pipes as they are moved laterally by the screws, and a saw mounted at the other side of the groups of screws beyond the first saw, the hubs of the screws in one group being enlarged at a point between the cutting points of the saws whereby to lift cropped pipes from said supporting means and move them lengthwise to the second saw.

4. Pipe handling apparatus comprising a group of substantially parallel right-hand conveyor screws, a group of substantially parallel left-hand conveyor screws at least some of which are disposed between some of the right-hand screws, said screws being arranged to receive pipes between their threads with the threads engaging only the rear sides of the pipes, means for rotating the screws to cause their threads to move the pipes longitudinally of the screws, means extending longitudinally of the screws for normally supporting the pipes above the screw hubs to prevent movement of the pipes lengthwise, a saw mounted at one side of the groups of screws for cropping the adjacent ends of the pipes as they are moved laterally by the screws, a saw mounted at the other side of the groups of screws beyond the first saw, and a guide member associated with the groups of screws between the saws and spaced a predetermined distance across the screws from the second saw, the hubs of the screws in one group being enlarged at a point between the cutting point of the first saw and said guide whereby to lift cropped pipes from said supporting means and move them lengthwise until they will clear said guide, and the hubs of the screws in the other group being enlarged at a point adjacent the guide whereby to move the cropped ends of the pipes lengthwise against the guide before their other ends are cut off by the second saw.

5. Pipe handling apparatus comprising a table of substantially parallel conveyor screws adapted to receive pipes between their threads with the threads engaging only the rear sides of the pipes, means for rotating the screws to cause their threads to move the pipes longitudinally of the screws, a saw mounted beside the table for cropping the ends of the pipes when they are moved laterally against it by the screws, and a helical member mounted beside the saw substantially parallel to it and the screws for receiving the end portions of the pipes and supporting them during sawing.

6. The combination with a saw and a conveyor for feeding pipes laterally through the saw, of a helical member mounted beside the saw with its axis extending perpendicular to the pipes, said member being adapted to receive the end portions of the pipes and give them two point support as they pass through the saw.

BENJAMIN P. HAZELTINE.